US005856397A

United States Patent [19]

Pope et al.

[11] Patent Number: 5,856,397

[45] Date of Patent: Jan. 5, 1999

[54] DRY GRINDING AID FOR DRY MILLING A CALCINED KAOLIN CLAY AND A RELATED METHOD

[75] Inventors: William H. Pope, Sandersville; Raymond Brock McNeely, Davisboro, both of Ga.

[73] Assignee: ECC International Inc., Roswell, Calif.

[21] Appl. No.: 748,250

[22] Filed: Nov. 12, 1996

[51] Int. Cl.[6] .......... C08K 3/34

[52] U.S. Cl. .......... 524/447; 106/416

[58] Field of Search .......... 406/416; 524/447

[56] References Cited

U.S. PATENT DOCUMENTS 3,586,823 6/1971 Schier .......... 219/347
4,381,948 5/1983 Mcconnell et al. .......... 106/288 B
4,561,597 12/1985 Cook et al. .......... 241/17
4,593,860 6/1986 Cook et al. .......... 241/23
4,693,427 9/1987 Bilimoria et al. .......... 241/23
4,820,554 4/1989 Jones et al. .......... 427/391
4,830,673 5/1989 Jones et al. .......... 106/487
4,868,228 9/1989 Gonnet et al. .......... 523/333
5,261,956 11/1993 Dunaway et al. .......... 106/416

*Primary Examiner*—Kriellion S. Morgan
*Attorney, Agent, or Firm*—Suzanne Kikel

[57] ABSTRACT

An improved method for dry milling calcined kaolin clays involves use of an effective amount of an ammonium polyacrylate dry grinding aid which is applied to a calcined kaolin clay product prior to dry milling. This improves flowability of the product through the mill, resulting in an increase in the grinding efficiency and, therefore, an increase in the production rate of the mill. The final product displays an increase in Hercules high shear viscosity, and therefore, an increase in the rheology in very high solids aqueous slurries, which is particularly useful in the coating of paper and paperboard products.

17 Claims, 1 Drawing Sheet

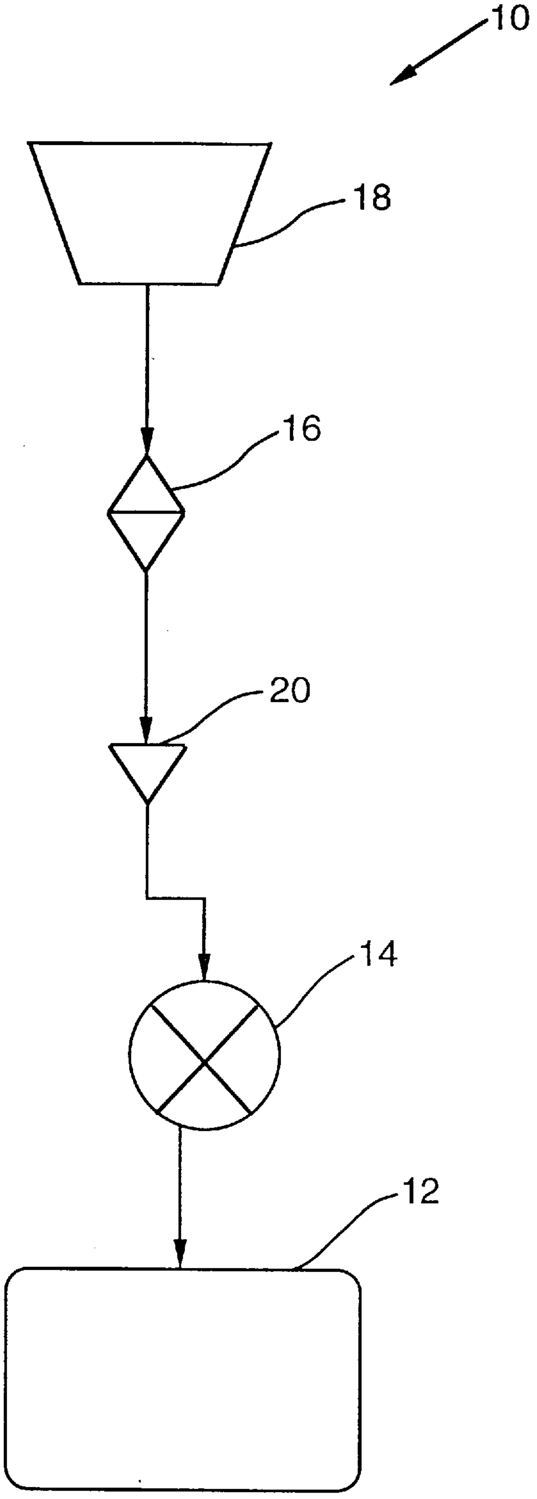
10
18
16
20
14
12

DRY GRINDING AID FOR DRY MILLING A CALCINED KAOLIN CLAY AND A RELATED METHOD

FIELD OF THE INVENTION

This invention relates generally to the production of improved calcined kaolin clay products. More particularly, this invention is directed to a dry grinding aid and a related method for dry milling a calcined kaolin powder. This method increases the production rate in the mill and the Hercules high shear viscosity of the resulting slurried kaolin products, thereby improving the quality of the final product as measured by the rheological properties of clay products.

BACKGROUND OF THE INVENTION

In the course of manufacturing paper and similar products, including paperboard and the like, it is well known to incorporate quantities of inorganic materials into the fibrous web in order to improve the quality of the resulting product. A number of inorganic materials have long been known to be effective for these purposes, such as titanium dioxide, which can be incorporated into the paper in the form of anatase or rutile. Titanium dioxide, however, is among the most expensive of known fillers. Accordingly, in recent years, considerable efforts have been made to develop satisfactory replacements for titanium dioxide.

Among the materials which have found acceptance as paper fillers are substantially anhydrous kaolin clays. Materials of this type are generally prepared by partially or fully calcining a crude kaolin clay, which may have been initially subjected to beneficiation steps in order to remove certain impurities, e.g. for the purpose of improving brightness in the ultimate product.

An "hydrous" kaolin generally means that the kaolin has not been subjected to calcination, or more specifically, it has not been heated to temperatures above about 450° C.

The term "anhydrous" generally refers to a kaolin clay which has been subjected to calcination, which means being subjected to heating of 450° C. or higher for a period which eliminates the hydroxyl groups thereby destroying the crystalline structure of the kaolinite. A "fully calcined" kaolin refers to kaolins which have been heated above the 980° C. exotherm, as opposed to having been rendered merely a "metakaolin". Reference may be had in the foregoing connection to Proctor U.S. Pat. No. 3,014,836 and to Fanselow et al U.S. Pat. No. 3,586,823, which disclosures are representative of portions of the prior art pertinent to fully calcined kaolins.

"Calcined" kaolin refers to an anhydrous kaolin clay such as the ALPHATEX® product of the assignee of the present invention. This product is a substantially anhydrous white kaolin clay pigment, which has unusual efficacy as a filler in paper sheets and similar paper products. This pigment also has application as a coating pigment for paper and as a pigment in paints and other filled systems. It generally consists of aggregates of anhydrous kaolin clay particles, and exhibits exceptionally high light-scatter and opacifying characteristics when incorporated as a filler in paper.

The ALPHATEX® product is further described in U.S. Pat. No. 4,381,948 to A. D. McConnell et al. and in U.S. Pat. No. 5,261,956 to W. H. Dunaway et al., both of which are assigned to the assignee of the present invention.

Calcined kaolin clay products, such as the ALPHATEX® product are often handled, shipped, and/or utilized (e.g. when coating papers) as aqueous slurries, i.e. the calcined kaolin clay is slurried in water to form a slurry, e.g. of approximately 40% to 60% solids content, more or less. The more viscous the product, generally, the more difficult it is to handle and to use. In the past, this has proven to be a problem, particularly where the solids content of the slurry exceeds about 50%, by weight.

For hydrous clays, the general problem of reducing clay viscosity has commonly involved chemical control by additives or elimination of a species tending to cause viscosity problems. Viscosity control in a calcined clay slurry often involves some type of milling which may be wet or dry, or comminution of the calcined material.

Wet milling involves exposing a fluid suspension of slurry of calcined kaolin clay to a grinding media, whereby incremental additions of the calcined kaolin clay are added and the milling is continued until the viscosity of the slurry is reduced. This process may have energy inputs of 200 hp-hr/ton, and is very difficult from an engineering viewpoint, requiring very complex and sophisticated controls.

Dry grinding of calcined kaolins is taught in the present assignee's U.S. Pat. Nos. 4,593,860 and 4,693,427, wherein the calcined kaolin clay is frictionally worked or milled by a media in the mill which is at least +5 mesh to decrease its clay-water viscosity and adhesiveness. The work inputs in the prior art may be from about 5 to about 40 hp-hr/ton of dry clay. The process of the prior art improves the handling characteristics for the treated clay with respect to bulk material handling systems, but an improved coating pigment would still be desirable.

U.S. Pat. No. 4,868,228 discloses the use of fully neutralized acid acrylic polymers as wet grinding aids for aqueous suspensions of coarse mineral materials, such as calcium carbonates. Monovalent and polyvalent neutralizing agents are used to prepare these wet grinding aids. This reference does not disclose or suggest the use of dry mill grinding aids for calcined kaolin. It also does not disclose or suggest the use of ammonium polyacrylates as dry grinding aids.

In common paper coating applications, the pigment properties often sought include high gloss, good printability, good opacity, and high brightness. Where calcined kaolins are used, manufacturers generally prefer to utilize a paper coating composition (the "coating color") which desirably incorporates from 15 to 20 parts per hundred by weight of the calcined kaolin in place of the more expensive pigments such as titanium dioxide. The coating color should include about 60 to 63% by weight of the total solids in order to be most effective. With the prior art calcined pigments, all of these requirements could not be readily achieved. In particular, in order to achieve calcined kaolin having 60 to 63% solids coating color, it is generally required by a customer to be able to use or handle the kaolin pigment at its equivalent of 60% solids, which is the percent weight of the solids (i.e. clays) in the liquid of the slurry. That is, the overall requirement is that the kaolin pigment have good rheological properties as at least a 60% solids aqueous slurry and also provide fully acceptable opacity, gloss, brightness, and printability when coated. The pigments of the prior art, while capable of being formed into such high solids slurries, tend to have very high dilitancy, and thus, poor rheological properties. In an effort to allow the prior art calcined pigments to be used, lower solids can be employed, but this tends to leave excess water in the coating color, with resultant running during coating.

A further property of the prior art calcined pigments that has diminished their value as coating pigments arises from the very porous, highly aggregated nature of their component structures. While these properties foster high opacity, i.e. good light scattering, they have a detrimental effect on gloss when the pigment is used in coating.

In order to overcome some of the shortcomings of the prior art calcined pigments, a method for improving the rheology of a calcined kaolin clay product is taught in the aforementioned U.S. Pat. No. 5,261,956. The resultant product is commercially available as DELTATEX® from ECC International Inc., which is the same assignee as that of the ALPHATEX® product and of the present invention. The DELTATEX® product is a calcined kaolin coating pigment, which displays good rheology in very high solids aqueous slurries, such as 59%, thereby facilitating its use in coating and in the preparation of coating colors, and which provides high gloss, high brightness, and good opacity and printability characteristics in the paper upon which it is applied.

It is known in the art to add ammonium polyacrylate as a dispersant to neutralize the charges on the surface of the clay particles during blunging. Proper dispersion is necessary during wet processing in order to separate the clay stacks so as to optimize liberation of the impurities trapped between the clay particles in the kaolin clay slurry. This is also necessary in order to achieve a rheology suitable for further processing, i.e. pumping or storing the kaolin clay slurry in tanks.

Being that the DELTATEX® product is a very desirable commercial commodity for use as a pigment for paper and paperboard coating applications, it is most advantageous to be able to increase the production rate of this product. One of the drawbacks to increasing production rates is believed to exist in the dry grinding process through the media mill. It is hypothesized that the static electricity in the dry media mill due to the dry, fine particles of the calcined clay powder oftentimes lessens the degree of flowability of the powder through the mill, thereby causing clogging and/or plugging of the mill, or causing the clay to stick to the media balls used in the mill and/or to the sides of the mill, resulting in downtime of the mill.

SUMMARY OF THE INVENTION

In accordance with the present invention, a novel dry grinding aid and an associated dry grinding method have been found to increase the production rate of a calcined kaolin clay powder which is processed in a dry media mill for preparing a coating pigment for paper or paper board products. This method produces a calcined kaolin clay powder which has excellent high shear rheology when formed into high solids aqueous slurries.

Thus, a kaolin clay powder of fine particle size, for example, one having a PSD showing greater than 80% less than ½ micrometer, and typically being 88 to 91% less than ½ micrometer, is calcined by conventional techniques. The resultant calcined kaolin clay product is then dry milled in a media mill using a work input of from about 100 to 160 hp-hr/ton of dry clay. Prior to the calcined product being dry milled, an effective amount of a dry grinding aid is applied by an application means, preferably by spraying the grinding aid onto the calcined kaolin clay product. Generally, this grinding aid is a conventional polyacrylate, such as a dispersant selected from the group consisting of polyacrylates, including sodium polyacrylates and ammonium polyacrylates. Preferably, ammonium polyacrylate is used as the dry grinding aid. An example of a suitable ammonium polyacrylate is Colloid 102, available from Rhone-Poulenc, Marietta, Ga. This product is about 60% to about 64% active on a dry basis and has a weight average molecular weight of 3,400.

While not wishing to be bound by any theory, it is believed that the dry grinding aid neutralizes the charge on the surface of the clay particles, thereby lessening the static electricity in the system, and reducing clogging and/or plugging of the mill by the fine particles during the milling process. The overall effect is an increase in the efficiency of the media mill. Thus, more work input is applied to the calcined kaolin clay with the addition of a grinding aid without requiring additional horsepower or without using additional equipment.

It is an object of the present invention to provide a method which increases or improves the production rate for dry milling a calcined kaolin clay powder, while improving or maintaining acceptable high shear rheology in high solids aqueous slurries, thereby facilitating its use in coating and in the preparation of coating colors.

It is a still further object of the present invention to provide an improved method for dry milling a calcined kaolin clay product of fine particle size of about 50% less than 0.5 micron, and generally 55 to 60% less than 0.5 micron, whereby the feed rate through the mill is increased, and whereby the resulting commercial product retains its desirable properties as a coating pigment.

It is a still further object of the invention to provide a grinding aid for the dry milling of a calcined kaolin clay powder of fine particle size where the calcined product is about 15 to 25% less than 0.5 micron. More particularly, it is an object of the present invention to provide a new use for conventional dispersants in the production of dry ground kaolin products.

These and other objects of the present invention will be better appreciated and understood by those skilled in the art from the following description of the single drawing, and the claims.

BRIEF DESCRIPTION OF THE DRAWING

The single drawing is a schematic of a mill arrangement demonstrating the teachings of the present invention.

DETAILED DESCRIPTION OF THE INVENTION

The present invention is directed to an improved method for preparing a calcined kaolin clay powder having improved high shear rheology in high solids (e.g. from about 58% to about 63% solids) aqueous slurries, comprising: a) calcining a kaolin clay powder, b) applying an effective amount of a dry grinding aid onto the calcined kaolin powder of step a) prior to dry milling; and c) dry milling the calcined kaolin clay powder of step a), thereby improving its flowability through a dry grinding mill and increasing the production rate of said mill, wherein the grinding aid is selected from the group consisting of polyacrylate dispersants.

The present invention is further directed to an improved method for preparing a calcined kaolin clay product having improved high shear rheology in high solids aqueous slurries, thereby facilitating its use in paper coating and in the preparation of coating colors and providing high gloss, high brightness, and good opacity and printability characteristics to the paper to which it is applied, the improvement comprising applying an effective amount of a dry grinding aid selected from the group consisting of polyacrylate dispersants to calcined kaolin clay prior to dry grinding.

The present invention is further directed to a method for preparing a calcined kaolin clay product for use as a coating pigment, the improvement comprising using an effective amount of an acrylate dispersant as a dry grinding aid, the preferred dispersant being ammonium polyacrylate.

The present invention is further directed to a method for increasing the production rate in a process for producing a calcined kaolin clay powder in a horizontal media mill, the improvement comprising applying an effective amount of a dry grinding aid selected from the group consisting of polyacrylate dispersants, to a calcined kaolin clay product prior to or simultaneous with introduction of said calcined kaolin clay product into said media mill.

The present invention is further directed to a coating color for coating paper, which provides high gloss, high brightness, and good opacity and printability characteristics in the paper product to which it is applied, comprising a calcined kaolin clay powder which has been dry milled in a media mill in the presence of an effective amount of a dry grinding aid selected from the group consisting of polyacrylate dispersants. Additionally, this invention improves the Theological properties of a high solids (e.g. about 58% to about 63% solids on a weight basis, and preferably, about 60% solids on a weight basis) aqueous slurry of a dry ground kaolin product.

As used herein, the term "effective amount" refers to that quantity of dry grinding aid necessary to improve the grindability of a kaolin clay and/or to improve the Hercules high shear viscosity of the clay being treated. More particularly, about 0.1 pound to about 10.0 pounds, and preferably, about 0.5 pound to about 3.0 pounds of the dispersant, on an active basis, is added per ton of dry mill feed. The dry grinding aid is generally supplied to the dry mill feed prior to it being introduced into a media mill.

In particular, the grinding aid of the invention is a dispersant polymer selected from the group consisting of polyacrylate dispersants, such as sodium polyacrylates and ammonium polyacrylates, having a number average molecular weight varying from about 3,000 to about 4,000, as determined by light scattering techniques. Preferably, these dispersants are selected from the group consisting of ammonium polyacrylates. These grinding aids may be prepared by conventional polymerization techniques. See, for example, the aforementioned U.S. Pat. No. 4,868,228, which discloses the preparation of polyacrylate dispersants useful as wet milling aids. Generally, such polyacrylates are available as aqueous solutions containing about 35% to about 45% polymer solids. Colloid-102 is shipped inside the solids range of about 39.5 to about 40.5% solids.

In a preferred embodiment, the grinding aid is ammonium polyacrylate, which is preferably sprayed onto the mill feed prior to the mill feed entering a media mill for a dry milling process.

The ammonium polyacrylate used in the examples of the invention is Colloid-102, available from Rhone-Poulenc, Marietta, Georgia, as stated hereinabove. This ammonium polyacrylate is, preferably, in aqueous solution form containing about 60% to about 64% polymer solids, on a dry active basis. Colloid-102 is generally shipped inside the solids range of 39.5% to 40.5% solids where the activity is about 24% to about 26%, and has a weight average molecular weight of 3,400, as determined by light scattering techniques.

The grinding aid may come in dry form which would then be mixed with water to form the desired solution, or it can be premixed and purchased in the desired solution form.

The present invention has particular utility relevant to calcined kaolin products, similar or equivalent to the DELTATEX® product, which is produced in accordance with the teachings of the aforesaid U.S. Pat. No. 5,261,956. This patent is incorporated herein by reference. This DELTATEX® product of U.S. Pat. No. 5,261,956 comprises porous aggregates of anhydrous kaolin clay particles of a fine particle size where typically at least 50% by weight of the aggregates are of less than 0.5 micrometer equivalent spherical diameter (ESD). The pigment has a normalized scatter of less than 640 and a porosity of less than 0.90 $cm^3/g$.

As taught by the aforesaid U.S. Pat. No. 5,261,956, in order to produce this product, a kaolin clay powder of this fine particle size is calcined at a sufficient temperature and for a sufficient period to destroy the crystallinity of same and render the powder substantially amorphous. The resulting calcined product is then dry milled in a media mill using a work input of from about 100 to 160 hp-hr/ton of dry clay. A media mill is known in the art as being a mill which contains a media, such as balls, ellipsoids, rods, or cylinders for grinding kaolin clay powder generally resulting in a substantial further particle size reduction. As is known in the art, a pulverizing step may succeed the dry milling step. This pulverizing step may be effected in such devices as the wellknown Hurricanes mill, which is a product of C.E. Bauer Co., of Chicago, Ill., and which is an high energy impact mill.

With reference to the single drawing, in a preferred embodiment, the present invention is employed in a dry media mill arrangement 10 for dry milling a calcined kaolin clay powder. The milling process is typically carried out in a horizontal ball mill 12, such as the types available commercially from the Patterson Equipment Company. The balls are generally small ceramic balls having diameters ranging from about ¼" to about 2". A more typical range is about 1 to 2 inches. Such mills typically have a horizontal feed screw 14 for introducing the mill feed (e.g. calcined kaolin clay powder) into the mill. An effective amount of aqueous solution of an ammonium polyacrylate grinding aid having a weight average molecular weight of about 3,400 is pumped by pump 16, using an adjustable flowmeter (not shown) from tote bin 18 to spray nozzle 20, which evenly applies the grinding aid onto the clay powder. The grinding aid is utilized as an aqueous solution, though dry polymers may be used with proper make-down equipment. Such solutions typically contain from about 35% to about 45% polymer solids on an active polymer basis. Preferably, from about 0.5 to about 3.0 pounds polymer on an active basis per ton of mill feed is supplied to the mill feed.

Even though not shown in the single drawing, as discussed above and as taught in U.S. Pat. No. 5,261,956, the kaolin clay product exiting mill 12 can be pulverized by a high energy impact mill to eliminate undesirable larger particles, usually particles of over 325 mesh. The work input during the pulverization step is preferably at least 30 hp-hr/ton of dry clay and preferably 50 to 75 hp-hr/ton of dry clay.

By adding a dry grinding aid, the efficiency of the mill to work the clay particles increases, which results in an increase in the throughput or production rate of the mill, and/or, a substantial increase in Hercules high shear viscosity, thereby, resulting in improved Theological properties of the final product as a percent solids aqueous slurry. Testing shows that the Hercules high shear viscosity is consistently higher than that of previous normal production values.

EXAMPLES

The following examples demonstrate the instant invention employing the ammonium polyacrylate available under the tradename Colloid-102, as a dry grinding aid used in conjunction with the DELTATEX® product referred to earlier. The pH of Colloid-102 is 7.0 to 7.5, with a Brookfield Viscosity of 25–50 cps, and a specific gravity of 1.16 to 1.19. The inventors do not intend their invention to be limited in any way by these examples.

Data was collected on post mill products processed by a horizontal ball mill associated with calciners and designated as horizontal mills No. 2, No. 6, and No. 4 located in a conventional kaolin plant owned by the assignee of this invention. The horizontal ball mills are of the type available commercially from Patterson Equipment Company.

Test Procedure and Results

Averaged test results for this data appear in Table 1 below. The historical data was drawn during a time frame of about 1½ months when ammonium polyacrylate was not used in the ball mills, and the experimental data represents a time frame of about a month when ammonium polyacrylate was used in the ball mills at the dosages shown. In general, about 3 pounds of ammonium polyacrylate on an active basis in aqueous form per ton of clay was used in the experiments for the No. 2, No. 6, and No. 4 horizontal ball mills, with additional experiments being performed with about 2 pounds/ton for the No. 6 horizontal ball mill.

Example 1—No. 2 Mill

For the No. 2 horizontal mill, 31 samples were analyzed for the historical time frame. Of these 31 samples, 30 samples were made down in the lab at 59+/−0.5% solids for high shear testing resulting in a DELTATEX® product, and only one sample did not meet this specification, resulting in 3.2% of the samples not making down. In general, if a product is made down at 59+/−0.5% and has a Hercules value of between 300 and 1700 at 18 dynes, then the product is considered to be a DELTATEX® product. If it does not make down at this percentage, then it does not meet the standards of the DELTATEX® product.

Based on the experimental data for this same time period where, of the 33 samples taken from the mill, all 33 samples were made down in at the lab at 59+/−0.5% solids for high shear testing for a DELTATEX® product. This is reflected in the Table 1 as 0% WNM. Additional data results which can be compared for the historical and experimental time periods is the production rate in tons per hour (TPH) for the calcined kaolin clay product processed by the mill which values are 2.2 and 2.57 tons/hour, respectively. The use of ammonium polyacrylate resulted in an increase of 0.37 tons/hour of clay being processed by the No.2 horizontal ball mill. The Hercules high shear viscosity resulted in an average of 207 rpm at 18 dynes for the 30 samples made down for the historical time period where ammonium polyacrylate was not used in the mill. Whereas for the experimental time frame, the viscosity testing for the samples resulted in an average of 226 rpm at 18 dynes. The benefit here in this example was mainly in the increased tonnage per hour. Even though not significantly shown herein, ammonium polyacrylate in the ball mill can increase the Hercules high shear viscosity, and therefore, the Theological properties of the final DELTATEX® product when slurried for further handling and processing.

Example 2—No. 6 Mill

Similar results in accordance with the objects of the invention are shown in Table 1 for the No. 6 horizontal ball mill when 3 pounds of ammonium polyacrylate in aqueous form and on an active basis per ton of product was used. The rate of the calcined kaolin clay processed by the mill increased from 3.4 tons/hour for the historical data to 3.85 tons/hour for the experimental data, and the Hercules viscosity value increased about 1437 rpm at 18 dynes from the historical average value of 450 rpm at 18 dynes to the experimental average value of 1887 rpm at 18 dynes. Make down improvements for the DELTATEX® product are seen with the product of the invention where only 1.5% samples did not make down as compared to 19.2% for the prior historical data. When 2 pounds of ammonium polyacrylate in aqueous form and on an active basis per ton of product was used, the rate of the calcined kaolin clay which was processed by the mill increased from 3.4 tons/hour for the historical data to 3.81 tons/hour for the experimental data, and the Hercules viscosity value increased from an average value of 450 rpm at 18 dynes for the historical data to an average of 1300 rpm at 18 dynes for the experimental data. Make down improvements for the DELTATEX® product are seen with the product of the invention where only 12.5% samples did not make down as compared to 19.2% for the historical data.

Little difference occurred for both the brightness and the Breuning abrasion values for the historical and experimental data. That is, the brightness value for the historical data was 92.79 and that for the experimental data was 92.77 and 92.86, respectively, and the abrasion value for the historical data was 21.85, while that for the experimental data was 22.99 and 23.2, respectively. The percent residue did increase significantly for the product of the invention, but this is not considered to be much of a problem since the DELTATEX® product is generally sold as a slurry for use as a coating, and therefore, is screened in order to eliminate undesirable larger particles usually particles over 325 mesh prior to shipping.

After the dry milling step in the horizontal mill, the product is generally pulverized in a high energy impact mill, as stated hereinabove and as taught in the aforementioned U.S. Pat. No. 5,261,956. It is believed that the increase in percent residue was caused more by the increased throughput at the pulverizing stage which succeeds the dry milling stage since the total mill system is only designed to produce 4 tons per hour, and whereby an increase in tonnage production in the horizontal media mill would more likely result in less efficiency of the pulverizing mill.

The overall data for additional tests for the No.6 horizontal ball mill showed that actual production rates can run about 3.9 to 4.0 tons/hour which is within its design and capacity, and still produce quality DELTATEX® product. If there is a bottleneck in the entire mill process, then it seems to be in the post horizontal ball mill stage, i.e. in the pulverizing stage.

Example 3—No. 4 Mill

The test results for the No.4 horizontal ball mill are also in line with the objects of the invention in that the production rate increased from 4.5 to 5.3 tons/hour and the Hercules viscosity increased from an average of 670 to an average of 1537 rpm at 18 dynes to produce quality DELTATEX® product. The percentage of samples which were made down into quality DELTATEX® product for both the historical and experimental time frames were comparable in that all samples were, in fact, made down. This is represented in Table 1 as 0% WNM. This result shows that the No. 4 horizontal ball mill worked well before using the ammonium polyacrylate, but, just not as well as when using the ammonium polyacrylate in that even though the samples for both the historical and experimental data made down to the DELTATEX® product, only the production rate was increased for the experimental data.

Additional runs on the No. 4 horizontal ball mill ran at a rate as high as 6.0 tons/hour but the quality of the DELTATEX® product seemed to drop off markedly at this rate, and certainly, above 5.4 tons/hour. Notwithstanding the fact that the No. 2 horizontal ball mill has the least production capacity of the three mills in which tests and samples were taken, it still showed an increase in its production rate when using the teachings of the present invention.

TABLE 1

| No. 2 Horizontal Mill | Historical | Experimental |
|---|---|---|
| Hercules: | 207 RPM @ 18D | 226 RPM @ 18D |
| Samples: | 31 | 33 |
| Samples Made: | 30 | 33 |
| Samples WNM: | 1 | 0 |
| % WNM: | 3.2% | 0% |
| TPH: | 2.2 | 2.57 |

| | | Experimental | |
|---|---|---|---|
| No. 6 Horizontal Mill | Historical | At 3 lb/ton | At 2 lb/ton |
| Hercules: | 450 RPM | 1887 RPM | 1300 RPM @ 18D |
| Samples: | 130 | 67 | 8 |
| Samples Made: | 105 | 66 | 7 |
| Samples WNM: | 25 | 1 | 1 |
| % WNM: | 19.2% | 1.5% | 12.5% |
| TPH: | 3.4 | 3.85 | 3.81 |
| Brightness: | 92.79 | 92.77 | 92.86 |
| Abrasion | 21.85 | 22.99 | 23.20 |
| % Residue: | 0.0103% | 0.0251% | 0.0059% |

| No. 4 Horizontal Mill | Historical | Experimental |
|---|---|---|
| Hercules: | 679 RPM @ 18D | 1537 RPM @ 18D |
| Samples: | 21 | 15 |
| Samples Made: | 21 | 15 |
| Samples WNM: | 0 | 0 |
| % WNM: | 0% | 0% |
| TPH: | 4.5 | 5.3 |

TPH is the tonnage reported by the weigh belt prior to the premills. Actual TPH through the horizontal mills is roughly 78% of the reported tonnage. % WNM is the percentage of shift composite samples that would not make down in the QC lab at 59 +/0.5% solids for high shear testing.

The inventors believe that the main reason for the difference in the results of the No. 2, No. 6, and No. 4 mills is probably due to the physical characteristics of each mill, such as its diameter, length, ball charge, and/or drives. The No. 6 mill was originally designed to produce the DELTATEX® product.

From the above data, it is apparent that the Hercules viscosity substantially increased after the addition of ammonium polyacrylate to the calcined kaolin clay. This translates into an increase in the rheological properties of the final product with a high solids aqueous slurry which may range from 58% to 63%. Even when the weather was inclement, such as coldness and/or dampness, which under normal conditions would produce little or no quality DELTATEX® product, the horizontal ball mills of the plant of the assignee were able to produce a quality product, and a product that met specification for the DELTATEX® product.

Tests of the product produced by the teachings of the present invention show a decrease in the pore volume as the Hercules viscosity values increased. This was expected, but is considered as not effecting the quality of the paper since the DELTATEX® product is generally used as a coating and not as a filler in the paper products where, in the latter instance, the pore volume has a great significance to the quality of the paper.

It is to be appreciated, that even though ammonium polyacrylate was used as the grinding aid in the testing which produced the above test results, that the present invention is not limited specifically to this chemical, and that other chemicals or dispersants can be used, such as sodium polyacrylates, sodium hexametaphosphates, or acrylic acid copolymers, or salts thereof. It is known in the art, that ammonium polyacrylate is used as a dispersant in slurries in order to prevent the solids from flocculating and settling out.

Another important result the inventors would like to point out is that with regard to the No. 6 horizontal mill, there was no down time for the mill for the time frame when the grinding aid was used. Whereas, previously there were 37.6 hours of down time in a 1½ month period, which generally translates into lost profits for the company. This downtime was due to plugging of the mill, which condition was apparently eliminated or lessened in view of the use of the teachings of the present invention.

Since the above test results were performed, in order to meet the specifications for the DELTATEX® product, about 1.5 pounds of ammonium polyacrylate on an active basis per ton of product is being used in the No. 6 mill, and about 2.0 to about 2.5 pounds of ammonium polyacrylate on an active basis per ton of product is being used in the No. 2 and No. 4 mills since the resultant product was "too good" in that the final product had a high solids aqueous slurry which ranged from 60% to 63%. It has also been necessary in some instances to blend the DELTATEX® product with the ALPHATEX® product of the aforementioned U.S. Pat. Nos. 4,381,948 and 5,261,956 in order to lower the Hercules high shear viscosity values for the final slurry product since the DELTATEX® product was resulting in too high a Hercules viscosity value, thereby not meeting the specifications of the customer. It is possible to use the blended product and the knowledge regarding ball milling and pulverizing to make a calcined clay slurry with acceptable rheology in the 63% solids range, and probably higher.

While the present invention has been particularly set forth in terms of specific embodiments thereof, it will be understood in view of the instant disclosure, that numerous variations upon the invention are now enabled to those skilled in the art, which variations yet reside within the scope of the present invention. Accordingly, the invention is to be broadly construed, and limited only by the scope and spirit of the claims now appended hereto.

We claim:

1. A method for dry milling a dry calcined kaolin clay powder in a media mill, comprising:

a) introducing said dry calcined kaolin clay powder into said media mill, and b) prior to or simultaneously with step a), applying a dry grinding aid onto said dry calcined powder to at least improve the flowability characteristic of said dry powder through said mill.

2. The method of claim 1 wherein said grinding aid is applied to said dry calcined powder at least prior to step a).

3. The method of claim 1 wherein said grinding aid is a dispersant polymer selected from the group consisting of polyacrylate dispersants.

4. The method of claim 1 wherein said grinding aid is a dispersant polymer selected from the group consisting of ammonium polyacrylates.

5. The method of claim 1 wherein said dispersant polymer is ammonium polyacrylate.

6. The method of claim 1 wherein said grinding aid is applied in an amount ranging from about 0.1 to about 10 pounds, on an active basis, per ton of said dry calcined kaolin clay powder being processed.

7. The method of claim 1 wherein said grinding aid is applied in an amount ranging from about 0.5 pound to about 3.0 pounds per ton of said dry calcined clay powder being processed.

8. In a method for preparing a dry calcined kaolin clay powder having good high shear rheology when in high solids aqueous slurries, thereby facilitating its use in coating and in the preparation of coating colors and providing high gloss, high brightness, and good opacity and printability characteristics in the papers to which it is applied, the improvement comprising:

a) introducing said dry calcined kaolin clay powder into a media mill, and b) prior to or simultaneously with step a), applying onto said dry calcined kaolin clay powder a dry grinding aid selected from the group consisting of polyacrylate dispersants to at least improve the flowability characteristics of said dry powder through aid mill.

9. The process of claim 8 wherein said grinding aid is sprayed onto said calcined kaolin clay product simultaneously with said calcined kaolin clay product being introduced into said media mill.

10. The process of claim 8 wherein said grinding aid is ammonium polyacrylate.

11. In a method for increasing the production rate of a dry calcined kaolin clay powder in a media mill, the improvement comprising:

applying a dry grinding aid selected from the group consisting of polyacrylate dispersants onto said calcined kaolin clay powder upon introduction of said calcined kaolin clay powder into said media mill to at least improve the flow characteristics of said dry powder through said mill.

12. In the method of claim 11 wherein said applying step consists of spraying said dry grinding aid onto said calcined kaolin clay product.

13. In the method of claim 11 wherein said dry grinding aid is ammonium polyacrylate.

14. A coating color for coating paper, which provides high gloss, high brightness, and good opacity and printability characteristics in the papers to which it is applied comprising:

a dry calcined kaolin clay powder which has been dry milled in a media mill in the presence of a dry grinding aid selected from the group consisting of polyacrylate dispersants which at least improves the flow characteristics of said dry powder through the mill.

15. A coating color of claim 14 wherein said grinding aid is ammonium polyacrylate.

16. A coating color of claim 14 wherein said dry grinding aid is applied onto the dry calcined kaolin clay powder prior to or while its introduction into said mill in an amount ranging from about 0.5 to about 3 pounds, on an active basis, per ton of said dry calcined kaolin clay being processed.

17. A coating color of claim 14 wherein said dry grinding aid is applied onto the dry calcined kaolin clay powder prior to or while its introduction into said mill in an amount ranging from about 0.1 pound to about 10.0 pounds, on an active basis, per ton of said calcined kaolin clay powder being processed.

* * * * *